P. A. MYERS.
PUMP.
APPLICATION FILED SEPT. 5, 1911.
1,098,520.
Patented June 2, 1914.
2 SHEETS—SHEET 1.
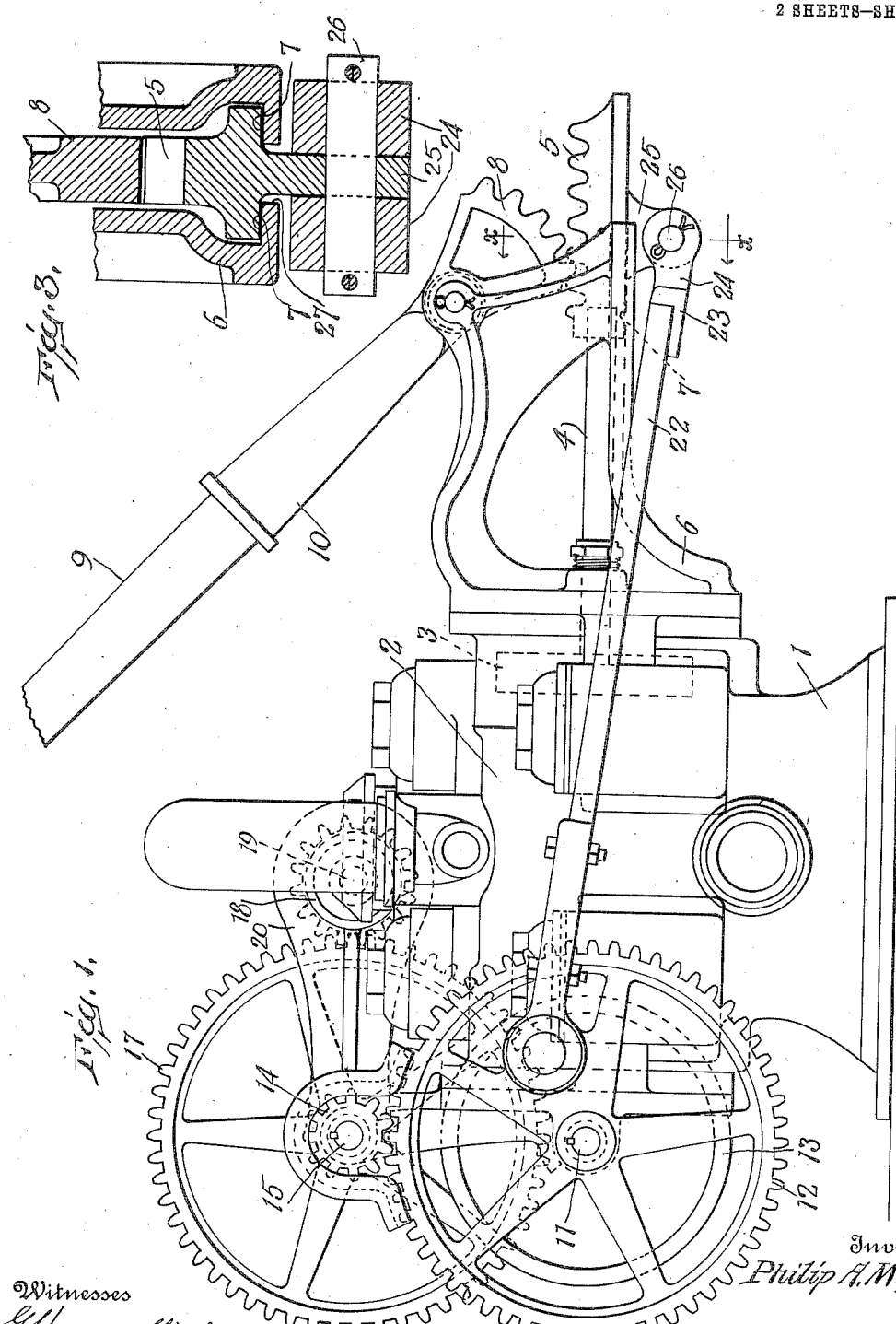
Witnesses
G. Howard Walmsley
Harriet L. Hammaker
Inventor
Philip A. Myers,
By Toulmin & Toulmin Reed
Attorneys

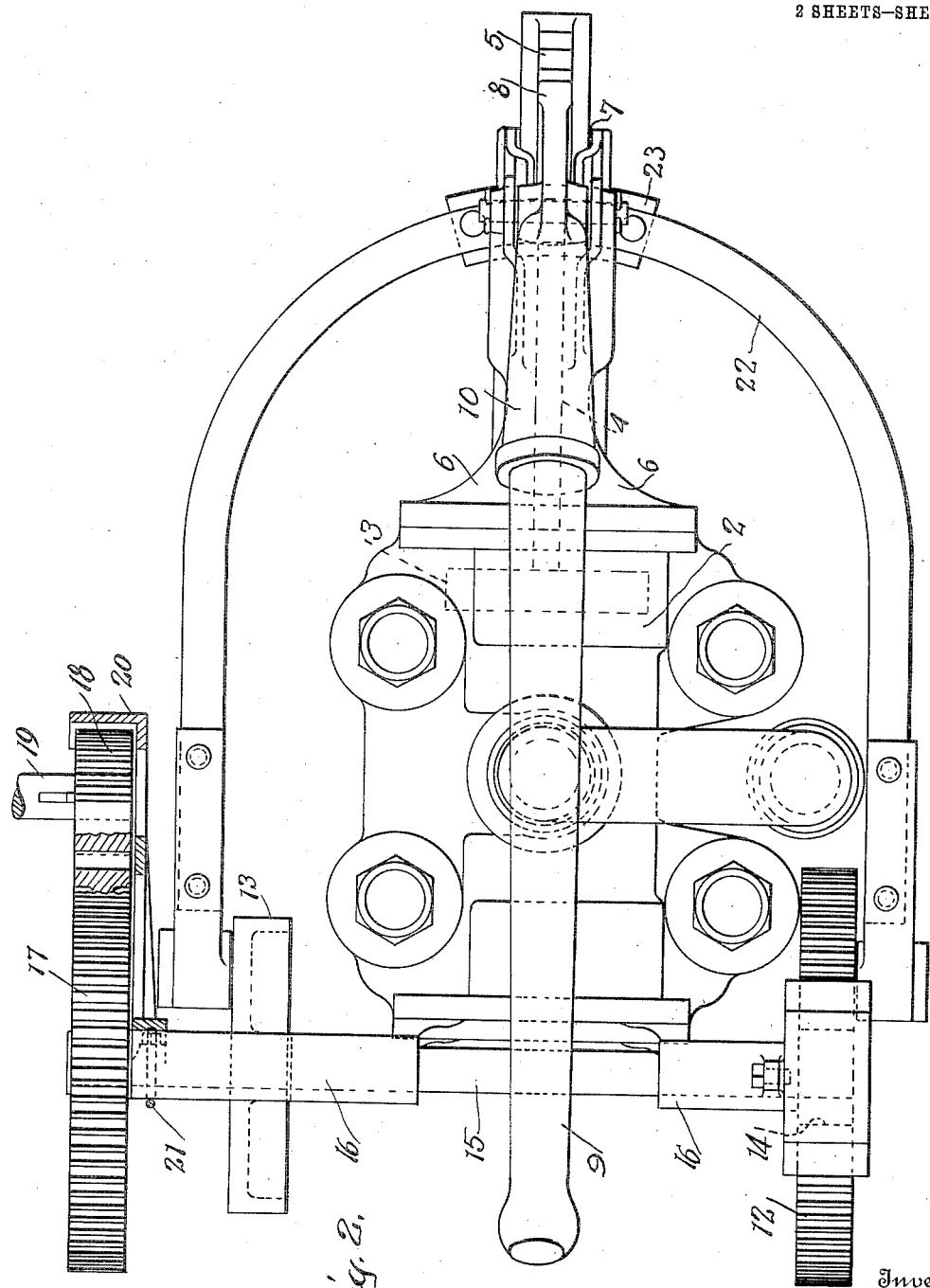

UNITED STATES PATENT OFFICE.

PHILIP A. MYERS, OF ASHLAND, OHIO, ASSIGNOR TO F. E. MYERS AND BROTHER, OF ASHLAND, OHIO, A COPARTNERSHIP CONSISTING OF FRANCIS E. MYERS AND PHILIP A. MYERS.

PUMP.

1,098,520.  Specification of Letters Patent.  Patented June 2, 1914.

Application filed September 5, 1911. Serial No. 647,583.

*To all whom it may concern:*

Be it known that I, PHILIP A. MYERS, a citizen of the United States, residing at Ashland, in the county of Ashland and State of Ohio, have invented certain new and useful Improvements in Pumps, of which the following is a specification, reference being had therein to the accompanying drawing.

This invention relates to pumps and the object of the same is to provide a pump which will be readily convertible from a hand-operated to a power operated pump; to provide such a pump in which the hand operated mechanism shall comprise a rack and segment; and to provide means for detachably connecting the power mechanism with the pumping mechanism which will be at once simple and efficient, and, when detached, will not interfere with the operation of the rack and segment.

In the accompanying drawings, Figure 1 is a side elevation of a pump embodying my invention; Fig. 2 is a top, plan view of the same; and Fig. 3 is a section on the line $x$ $x$ of Fig. 1.

In these drawings I have shown my invention as embodied in a thresherman's tank pump, but it will be obvious that it can be applied to pumps of other kinds. The pump here shown comprises a supporting member or base 1 which carries the several operating parts of the mechanism. A cylinder 2 is mounted on the base 1 and has mounted therein the usual piston 3 having a piston rod 4 extending beyond one end of the cylinder and provided at its outer end with a rack 5 which, in the present instance, is in the form of a casting formed separately from and rigidly secured to the piston rod. Carried by the supporting member 1 and preferably connected directly to the adjacent end of the cylinder 2 is a bracket 6 provided with a guideway 7 for the rack 5 which reciprocates freely therein. Pivotally mounted in the upper portion of the bracket 6 is a toothed segment 8 which meshes with the toothed rack 5 and is provided with a handle 9 by means of which the rack and segment may be actuated to impart movement to the piston. The handle 9 is preferably detachably connected to the segment by inserting the same in a tapered socket 10 rigidly secured to and, in the present instance, cast integral with the segment. Carried by the supporting member 1 and preferably mounted on that end of the cylinder opposite the bracket 6 is a shaft 11 having mounted thereon a gear 12 and a crank wheel 13. Meshing with the gear 12 is a pinion 14 rigidly secured to a shaft 15 mounted in bearing brackets 16 mounted on the cylinder 2. Loosely secured to one end of the shaft 15 is a gear 17 which meshes with a pinion 18 carried by a shaft 19 which may be an engine shaft or may be connected with any suitable power mechanism. A housing 20 incloses the pinion 18 and is adjustably mounted on one of the bearings 16, by means of a clip 21, to enable it to be adjusted to accommodate the pinion 18 to shafts arranged at different heights. The connection between the power mechanism and the pumping mechanism preferably comprises a bail 22, here shown as formed from a single bar of metal bent into a substantially U-shape, having its arms arranged on opposite sides of the cylinder and connected to the crank wheel 13 and the gear 12, respectively. At its forward or transverse portion this bail is provided with suitable means for connecting the same to the piston rod 4. As here shown this means comprises a bracket 23 rigidly secured to the central part of the transverse portion of the bail and having two lugs 24 adapted to extend on opposite sides of a lug 25 rigidly secured to the rack 5 and here shown as cast integral therewith. The connection between the lugs 24 and the lug 25 is preferably a pivoted one and is here shown as comprising a pin 26. The guideway 7 in which the rack 5 reciprocates is provided with a slot 27 to receive the lug 25.

When the pump is to be power operated the handle 9 is removed from the socket 10, the bail 22 connected with the piston rod and power applied to the shaft 11. When it is desired to actuate the pump by hand the pin 26 is withdrawn to disconnect the bail from the pump rod and the handle 9 inserted in the socket 10. It will be apparent that the operation of the device either by hand or by power is very simple and that the pump can be converted from a hand operated to a power operated pump with a very small amount of effort, and further that the connection between the power operated mechanism and the pump rod is of a very simple character and is readily detachable from the pump rod and at the same time is such that it will not interfere with the operation of the rack and segment of the hand operated mechanism.

While I have shown and described one embodiment of my invention I wish it to be understood that this has been chosen for the purpose of illustration only and that I do not desire to be limited to the details of construction shown and described, for obvious modifications will occur to a person skilled in the art.

Having thus fully described my invention, what I claim as new and desire to secure by Letters Patent, is:—

1. In a pump, a base, a horizontal cylinder mounted on said base, a piston mounted in said cylinder, a piston rod connected with said piston and having a rack at its outer end, a bracket secured to the end of said cylinder and having a guideway to support and guide said rack, said bracket having a slot extending lengthwise of said guideway and said rack having a part extending through said slot, a toothed segment pivotally mounted on said bracket and meshing with said rack, a handle connected with said segment, a shaft mounted at that end of said cylinder opposite said bracket, means for actuating said shaft, and a connecting rod secured to that part of said rack which projects through said slot and having a crank connection with said shaft.

2. In a pump, a base, a horizontal cylinder mounted on said base, a piston mounted in said cylinder, a piston rod connected with said piston and having a rack at its outer end, a bracket secured to the end of said cylinder and having a guideway to support and guide said rack, said bracket having a slot extending through the lower wall of and lengthwise of said guideway and said rack having a lug extending through said slot, a toothed segment pivotally mounted on said bracket and meshing with said rack, a handle detachably connected with said segment, a shaft mounted at that end of said cylinder opposite said bracket, a gear mounted on one end of said shaft, and a crank mounted on the other end thereof, a U-shaped connecting rod having its parallel arms connected to said gear and said crank wheel, respectively, and having its transverse portion provided with lugs pivotally connected to the lug on said rack.

In testimony whereof, I affix my signature in presence of two witnesses.

PHILIP A. MYERS.

Witnesses:
W. W. INGMAND,
R. M. TUBBS.